United States Patent
Pentikäinen et al.

(10) Patent No.: US 6,185,412 B1
(45) Date of Patent: Feb. 6, 2001

(54) PROCEDURE AND SYSTEM FOR ENSURING EMERGENCY COMMUNICATION IN A WIRELESS LOCAL LOOP ENVIRONMENT

(75) Inventors: Heimo Pentikäinen; Jussi Sarpola; Aki Suhonen; Markku Vimpari, all of Oulu (FI)

(73) Assignee: Nokia Telecommunications Oy, Espoo (FI)

( * ) Notice: Under 35 U.S.C. 154(b), the term of this patent shall be extended for 0 days.

(21) Appl. No.: 09/314,978

(22) Filed: May 20, 1999

Related U.S. Application Data

(63) Continuation of application No. PCT/FI97/00636, filed on Oct. 20, 1997.

(30) Foreign Application Priority Data

Nov. 26, 1996 (FI) ........................................................ 964714

(51) Int. Cl.$^7$ ................................................. H04Q 07/38
(52) U.S. Cl. .................... 455/404; 455/422; 455/437; 455/450; 455/464; 455/465; 455/521
(58) Field of Search ................................... 455/404, 403, 455/422, 450, 437, 438, 462, 463, 464, 465, 521, 550, 552, 553, 554, 555, 557, 558, 561

(56) References Cited

U.S. PATENT DOCUMENTS

| | | |
|---|---|---|
| 5,206,557 | 4/1993 | Bobbio . |
| 5,680,439 | * 10/1997 | Aguilera et al. ..................... 455/404 |
| 5,862,485 | * 1/1999 | Linneweh, Jr. et al. ............. 455/450 |
| 5,884,148 | * 3/1999 | Bilgic et al. ..................... 455/404 X |
| 5,937,019 | * 8/1999 | Padovani ........................ 455/438 X |

FOREIGN PATENT DOCUMENTS

| | | |
|---|---|---|
| 0 680 230 | 11/1995 | (EP) . |
| 962465 | 12/1997 | (FI) . |
| 962575 | 12/1997 | (FI) . |
| WO 97/21314 | 6/1997 | (WO) . |

OTHER PUBLICATIONS

Mar. 20, 1998, International Search Report for International Application No. PCT/FI97/00636.
Bobbio, et al., "Integrated Force Array: Positioning Drive Applications," Proc. SPIE Conf. on Smart Structure and Materials, p. 123, (Feb. 23, 1996).

* cited by examiner

*Primary Examiner*—Fan Tsang
*Assistant Examiner*—Philip J. Sobutka
(74) *Attorney, Agent, or Firm*—Altera Law Group, LLC

(57) ABSTRACT

The invention relates to a procedure for ensuring emergency calls in a wireless local loop environment which is based on technology employed in a mobile telephone system and which comprises a telephone exchange (1), an access node (2) connected to the telephone exchange, a terminal device (3) and a base station (4) connected to the telephone exchange via the access node and serving to transmit call signals between the access node and the terminal device, in which the home network (5) of the terminal device is defined by the base station and the associated access node and in which base stations (7) of other networks are disposed in the environment of the local loop, so that the terminal device receives information signals from the surrounding base stations and, based on said information signals, determines the base station it is communicating with, and the emergency call is set up via any base station compatible with the terminal device. To ensure successful set-up of an emergency call when connection between the terminal device (3) and the telephone exchange (1) of its home network (5) is lost, a dial tone is generated by means of the terminal device, an emergency number dialed via the terminal device is identified and the emergency call function of the mobile telephone system is used for the set-up of the emergency call.

11 Claims, 2 Drawing Sheets

PROCEDURE AND SYSTEM FOR ENSURING EMERGENCY COMMUNICATION IN A WIRELESS LOCAL LOOP ENVIRONMENT

This application is a con of PCT/FI97/00636 filed Oct. 20, 1997.

1. FIELD OF THE INVENTION

The present invention relates to a procedure for ensuring an emergency call in a wireless local loop environment, in which a terminal device is connected via a wireless link to a base station and further to an access node and a telephone exchange.

2. DESCRIPTION OF RELATED ART

In a wireless local loop (WLL), a terminal device is connected via a wireless link to an access node or a WLL controller. A WLL system may be based e.g. on technology used in a mobile telephone system, such as the GSM/DCS1800 technology (GSM, Group Special Mobile; DCS, Digital Cellular System). Between the terminal device and the access node there is a base station, through which call signals sent by the terminal device over a radio channel are transmitted via the access node to a public telephone network and vice versa. An access node or WLL controller can be connected to the telephone exchange using e.g. the V5.1 or V5.2 protocol.

Open interfaces (V5.1 and V5.2) between an access node and a telephone exchange are defined in the ETSI (European Telecommunications and Standards Institute) standards of the ETS 300 324 and ETS 300 347 series. V5 interfaces enable subscribers belonging to a physically separate access network, which may be either a wired or a wireless network, to be connected to a telephone exchange using a standard interface. A dynamic concentrator interface V5.2 consistent with the standards ETS 300 347-1 and 347-2 consists of one or more (1–16) PCM (Pulse Code Modulation) cables. One PCM cable comprises 32 channels, each of which with a transfer rate of 64 kbit/s, i.e. 2048 kbit/s in all. The V5.2 interface supports analogue telephones as used in the public telephone network, digital, such as ISDN (Integrated Services Digital Network) basic and system subscriptions as well as other analogue or digital terminal equipment based on semi-fixed connections.

In a wireless local loop, emergency calls are only transmitted via the particular network the terminal device belongs to, as is generally done in networks employing the GSM/DCS1800 technology. However, in the event of difficulties, e.g. when the operation of the network of the terminal device has been interrupted for some reason or when there occur other forms of rejection in the system, for instance an insufficiency of radio channels, emergency calls cannot be transmitted. In the event of rejection, calls from the terminal device are inhibited. In this case, no dial tone is generated for the subscriber when the latter tries to initiate a connection, i.e. 'to pick up the headphone'. An example of a rejection situation is the case where the connection between the local exchange and the WLL controller fails. In this case, all calls initiated by the terminal device, including emergency calls, are rejected. Rejection is generally indicated via the terminal device by not giving the subscriber a dial tone. However, it is possible to provide a separate emergency link from the WLL controller to an exchange in a wired network and further to an emergency number. On the other hand, the terminal device may be within the operating range of another functional network, such as a mobile telephone network, in which case this other network could be used for the transmission of an emergency call. However, the problem in prior-art systems is that in either case the terminal device does not even generate a dial tone for the subscriber, which is why the subscriber is likely to give up trying to make an emergency call although this would be technically possible.

SUMMARY OF THE INVENTION

The object of the present invention is to eliminate the problem described above. A specific object of the present invention is to present a method by which the subscriber can always make an emergency call via a wireless terminal device when there is a radio link to a base station that functionally corresponds to a base station in the home network of the terminal device.

In the procedure of the present invention for ensuring an emergency call in a wireless local loop environment, such as a WLL system, based on a technology employed in a mobile telephone system, such as the GSM/DCS1800 technology, the system comprises a telephone exchange and an access node connected to the telephone exchange e.g. via a V5 interface. Furthermore, the system comprises a base station connected to the access node and further to the telephone exchange, and a terminal device communicating via a radio link with the base station. A home network is defined for the terminal device so that the home network comprises a given base station, a given access node and a subscriber connection defined in the telephone exchange. In addition, base stations of other networks, e.g. base stations of GSM networks, are disposed in the environment of the local loop, and the terminal device receives information signals from the surrounding base stations and, based on these information signals, determines the base station it is communicating with. In a normal situation, the terminal device only communicates with base stations of its home network. Thus, an emergency call can be made using any base station available.

According to the invention, in the event of failure or rejection in the home network, i.e. when connection between the terminal device and the telephone exchange of its home network is lost, a dial tone is generated by the terminal device, so the user of the terminal device becomes aware that the device is ready for a call. Next, the dialled emergency number, e.g. the generally used string 112, is identified and the emergency call is set up using the emergency call function of the mobile telephone system.

As compared with prior art, the present invention has the advantage that, in a wireless system, the subscriber can always make an emergency call when this is technically possible, i.e. always when the terminal device is able to establish a connection to a base station. A further advantage provided by the invention is that, upon hearing a dial tone, the user can conclude that it is possible to make a call, so he/she can call an emergency number even if connection to the home network telephone exchange should be inhibited for any reason.

In an embodiment, when communication with the home network base station is not possible, an emergency call is set up using a base station of some other network. The other network may be a base station outside the mobility area of the terminal device, a base station in another wireless local loop, a base station maintained by any teleoperator, or some other base station compatible with the terminal device. Compatibility in this context means that the terminal device would be able to use that base station for call setup if it had the right of access to the network to which the base station belongs. The signals between the terminal device and the base station are generally transmitted via a radio channel, which is a given frequency band reserved for the base station.

In a preferred embodiment of the present invention, a string corresponding to the number to be dialled for an emergency call is stored in the terminal device. This can be done e.g. by reading the emergency numbers stored in the subscriber identity module (SIM), e.g. SIM card, of the terminal device. On the other hand, if the terminal device is based e.g. on the GSM system, the string 112 is always recognised as an emergency number. After this, the string dialled into the terminal device is compared with the strings stored in the terminal device and if this comparison indicates that an emergency number is being called, operation is continued using an emergency call function and the emergency call is set up.

In a preferred embodiment of the procedure of the present invention, the terminal device is sent data indicating that communication with the home network exchange is impossible, and, based on this information, a dial tone is generated in the terminal device when the subscriber is starting a call. The terminal device can also be informed about the communication failure by transmitting via the network a bar code to the terminal device when the latter is attempting a normal call. After this, if an emergency number is dialled via the terminal device, the call is transmitted to the access node of the home-network, if the link between the home network base station and the access node is in order and if the terminal device is able to communicate with the base station. Calls attempted to any other numbers except emergency numbers will be rejected. The call is then connected further by using an emergency call function defined in the access node. When the connection to the telephone exchange of the home network of the terminal device fails, the terminal device generates a dial tone that is different from the dial tone heard in a normal situation. Correspondingly, if the connection to the home network access node fails, a dial tone differing from the normal situation can be generated, so the caller will know that the link to the home network is out of order. If the link between the access node and the telephone exchange is overloaded, in other words no free time slots are available for emergency calls, one of the current calls can be disconnected by the access node. After this, the time slot thus made available can be used for connecting the emergency call further from the access node.

BRIEF DESCRIPTION OF THE DRAWINGS

In the following, the invention will be described by the aid of a few examples of its embodiments by referring to the-attached drawing, in which.

BRIEF DESCRIPTION OF THE INVENTION

Figure 1:
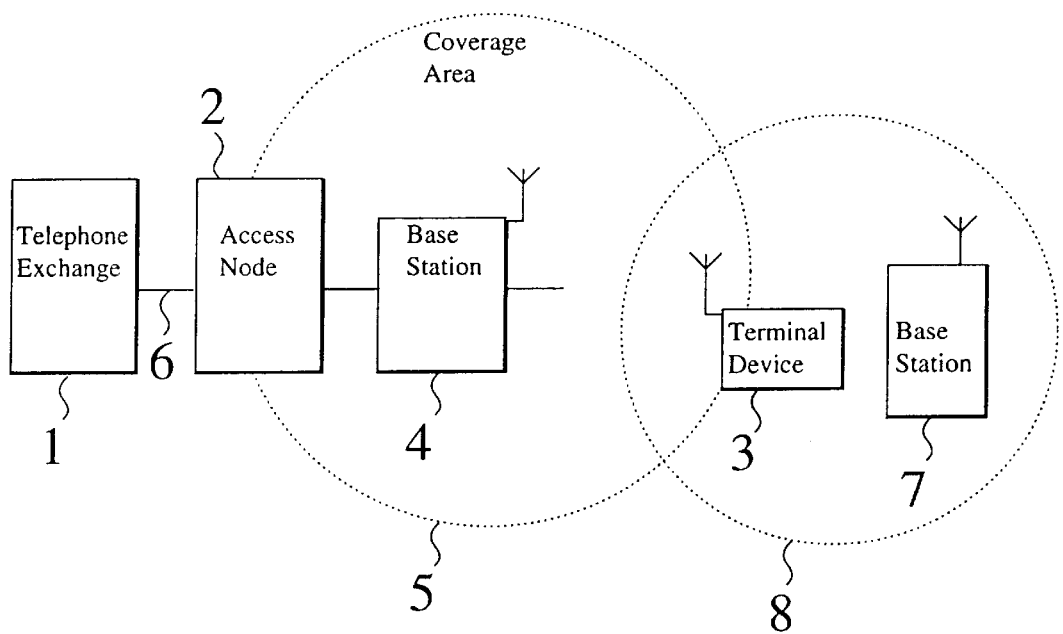
FIG. 1 is a diagram representing a first embodiment of the system of the invention.

The wireless local loop system presented in FIG. 1 comprises a telephone exchange 1 and an access node 2 connected to it. The access node 2 acts as a concentrating element between the telephone exchange 1 and the terminal device 3, connecting the terminal device to the telephone exchange 1. In this example, the access node 2 is connected via V5.2 interface 6, which comprises 1–16 PCM cables (2 Mbit/s), to the exchange terminal (ET) (not shown) of the telephone exchange 1, the exchange terminal being provided with the functions required for the V5 interface. The system illustrated by the figure further comprises a base station 4 with a given coverage area 5, which is also the area of the home network of the terminal device 3 and the mobility area of the terminal device 3. In the system presented in FIG. 1, a connection between the terminal device 3 and the telephone exchange 1 is set up by transmitting signals between the base station 4 and the terminal device 3 by radio and from the base station via a wired, radio or other link to the access node 2 and further via the V5 interface 6 to the telephone exchange 1. FIG. 1 further shows a base station 7 belonging to another network, and the terminal device 3 is also within the coverage area 8 of this other base station. Thus, in a normal situation, the terminal device 3 receives signals both from base station 4 and from base station 7, but uses only the base station 4 of its home network for call setup.

Figure 2:
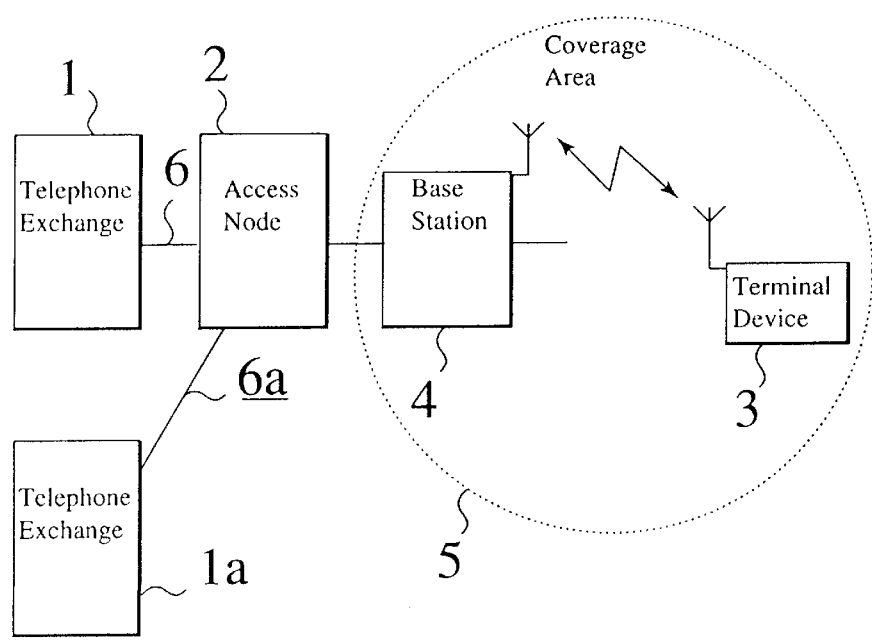
FIG. 2 is a diagram representing a second embodiment of the system of the invention.

The system presented in FIG. 2 corresponds to the system in FIG. 1 except that the access node 2 is connected via a second interface, a so-called backup V5 interface 6a to a telephone exchange 1a other than the home network 5 telephone exchange. The purpose of this connection is to guarantee successful emergency communication in the event of a failure in V5 interface 6. Such an arrangement is known in prior art and its various applications are described in e.g. in specifications FI 962,465 and FI 962,575, submitted by the same applicant as the present application. Therefore, referring to the aforesaid specifications, this arrangement for ensuring emergency communication will not be described in detail in the present application.

Figure 3:
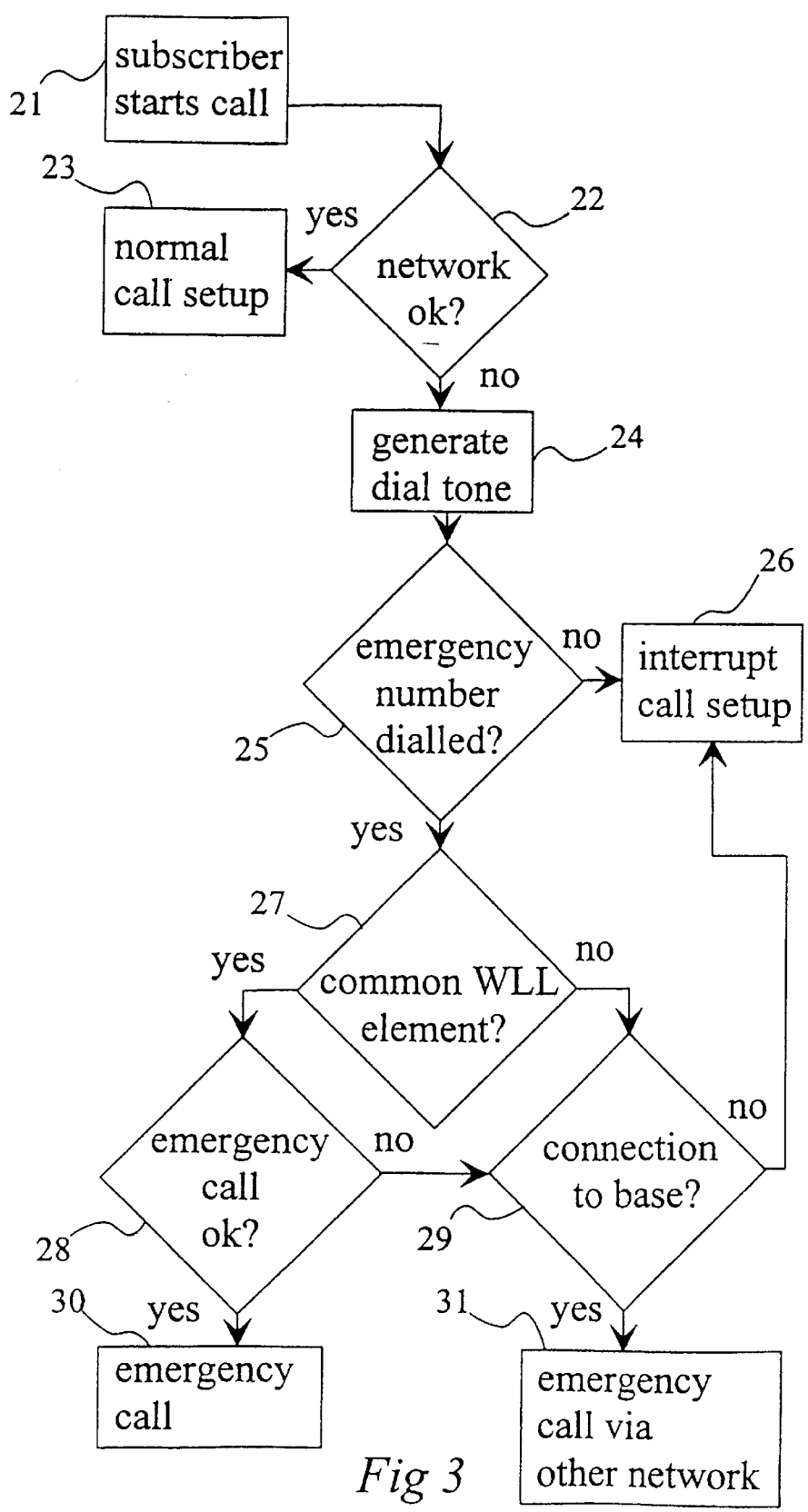
FIG. 3 is a flow diagram representing a call process in an embodiment of the present invention.

FIG. 3 presents a flow chart representing the call setup algorithm in situations exemplified by FIGS. 1 and 2. In the following, referring to the drawing, an example of the procedure of the invention for ensuring emergency calls in a wireless local loop environment will be described. First, the subscriber activates the terminal device 3 to start a call, block 21. Next, in block 22, the system checks whether a normal link from the terminal device 3 to the base station 4, to the wireless local loop access node 2 and further to the telephone exchange 1 exists. If the link is in order, the normal call setup procedure is started in block 23. If the link fails, if rejection appears in the wireless network or a failure code or equivalent is received by the terminal device, then the terminal device 3 generates a dial tone (block 24), which may differ from the dial tone used in a normal situation so the user will know that the connection to the home network has failed. Next, the dialled number is received in the terminal device 3 and compared in block 25 with numbers stored in the terminal device, and if this comparison indicates that the dialled number is not an emergency number, then the call setup procedure is interrupted, block 26. If the dialled number is an emergency number, operation is continued in block 27, where a check is made to ascertain whether a connection to the home network base station 4 and further to the WLL element 2 is available. If no connection to the home network WLL element can be set up, then the procedure continues in block 29, where the system checks whether a connection to a base station 7 of some other network is available. If not, control is passed to block 26 and the call setup procedure is interrupted. If a connection to a base station of another network is available, then the emergency call is set up via this other network by applying an emergency call setup procedure known in itself, block 31. If, in block 27, the link to the WLL element is in order, then control is passed to block 28, where a check is made to establish whether it is possible in the case of failure of the normal V5 interface 6 to connect the emergency call from the WLL element onwards e.g. via a backup V5 interface 6a. If it is, then the emergency call is set up, block 30.

The invention is not limited to the examples of its embodiments described above, but instead many variations are possible within the framework of the inventive idea defined by the claims.

What is claimed is:

1. A method for ensuring emergency calls in a wireless local loop environment which is based on technology employed in a mobile telephone system and which comprises a telephone exchange (1), an access node (2) connected to the telephone exchange, a terminal device (3) and a base station (4) connected to the telephone exchange via the access node and serving to transmit call signals between the access node and the terminal device, in which the home network (5) of the terminal device is defined by the base station and the associated access node and in which base stations (7) of other networks are disposed in the environment of the local loop, so that the terminal device receives information signals from the surrounding base stations and, based on said information signals, determines the base station it is communicating with, comprising, when connection between the terminal device (3) and the telephone exchange (1) of its home network (5) is lost, a dial tone is generated by means of the terminal device, an emergency number dialled via the terminal device is identified and the emergency call function of the mobile telephone system is used for the setup of an emergency call.

2. The method as defined in claim 1, wherein a base station (7) of another network is used for the setup of an emergency call when the connection to the base station (4) of the home network (5) fails.

3. The method as defined in claim 1, wherein the signals between the terminal device (3) and the base station (4, 7) are transmitted via a radio channel.

4. The method as defined in claim 1, wherein a string corresponding to an emergency number is stored in the terminal device (3), the string is compared with the string input into the terminal device and, based on this comparison, an emergency call is set up.

5. The method as defined in claim 4, wherein the string corresponding to an emergency number is read into the terminal device (3) from a subscriber identification unit attached to it.

6. The method as defined in claim 1, wherein the terminal device (3) is sent information indicating that no connection to the telephone exchange (1) of the home network (5) can be established; a dial tone is generated in the terminal device; a dialled emergency number is received in the terminal device; the call is connected to the access node (2) of the home network; and the call is connected further using an emergency call function defined in the access node.

7. The method as defined in claim 1, wherein, in the event of an overload on the interface between the access node (2) and the telephone exchange (1), one of the current calls is disconnected by the access node and the capacity thus made available is used for the connection of the emergency call from the access node onwards.

8. The method as defined in claim 1, wherein, when no connection to the telephone exchange (1) of the home network (5) of the terminal device (3) can be established, a dial tone differing from the dial tone used in a normal situation is generated by means of the terminal device.

9. The method as defined in claim 1, wherein the emergency call is set up via any base station compatible with the terminal device with which the terminal device is able to communicate.

10. The method as defined claim 1, wherein, in a failure situation, calls attempted to other than emergency numbers are rejected.

11. The method as defined in claim 1, wherein the mobile telephone system is based on GSM/DCS1800 technology.

* * * * *